United States Patent
Xiong et al.

(10) Patent No.: US 11,961,966 B2
(45) Date of Patent: Apr. 16, 2024

(54) NON-AQUEOUS ELECTROLYTE AND LITHIUM ION BATTERY

(71) Applicant: SHENZHEN CAPCHEM TECHNOLOGY CO., LTD., Guangdong (CN)

(72) Inventors: Dejun Xiong, Guangdong (CN); Qiao Shi, Guangdong (CN); Shiguang Hu, Guangdong (CN); Jiaojiao Yun, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 558 days.

(21) Appl. No.: 17/294,176

(22) PCT Filed: Nov. 22, 2019

(86) PCT No.: PCT/CN2019/120168
§ 371 (c)(1),
(2) Date: May 14, 2021

(87) PCT Pub. No.: WO2020/103923
PCT Pub. Date: May 28, 2020

(65) Prior Publication Data
US 2022/0013810 A1  Jan. 13, 2022

(30) Foreign Application Priority Data
Nov. 23, 2018  (CN) .......................... 201811412857.9

(51) Int. Cl.
| H01M 10/00 | (2006.01) |
| C07F 9/09 | (2006.01) |
| H01M 4/505 | (2010.01) |
| H01M 4/525 | (2010.01) |
| H01M 10/0525 | (2010.01) |
| H01M 10/0567 | (2010.01) |
| H01M 10/0568 | (2010.01) |
| H01M 10/0569 | (2010.01) |
| H01M 4/02 | (2006.01) |

(52) U.S. Cl.
CPC .......... *H01M 10/0567* (2013.01); *C07F 9/09* (2013.01); *H01M 4/505* (2013.01); *H01M 4/525* (2013.01); *H01M 10/0525* (2013.01); *H01M 10/0568* (2013.01); *H01M 10/0569* (2013.01); *H01M 2004/028* (2013.01)

(58) Field of Classification Search
CPC ......... H01M 10/0567; H01M 10/0568; H01M 10/0569; H01M 10/0525; H01M 4/525; H01M 4/505
See application file for complete search history.

(56) References Cited

U.S. PATENT DOCUMENTS

2003/0113635 A1*  6/2003  Gan ...................... H01M 4/587
429/232

FOREIGN PATENT DOCUMENTS

| CN | 1310867 A | 8/2001 |
| CN | 103038931 A | 4/2013 |

(Continued)

OTHER PUBLICATIONS

International Search Report of PCT Patent Application No. PCT/CN2019/120168 dated Feb. 3, 2020.

*Primary Examiner* — Cynthia H Kelly
*Assistant Examiner* — Monique M Wills

(57) ABSTRACT

Provided is a non-aqueous electrolyte, comprising a solvent, a lithium salt, an additive A and an additive B, the additive A is selected from compound represented by structural formula 1, and the additive B is selected from one or more of compounds represented by structural formula 2 and structural formula 3:

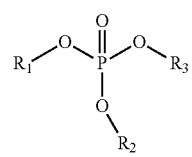

Structural formula 1

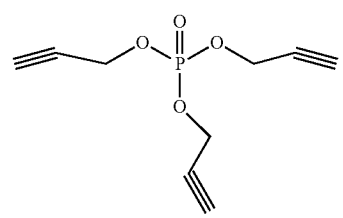

Structural formula 2

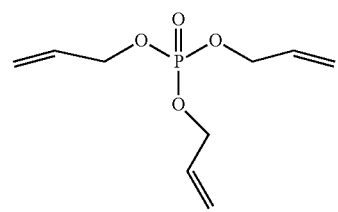

Structural formula 3

R1 is an alkenyl with 2-5 carbon atoms or an alkynyl with 2-5 carbon atoms, R2 is a fluoroalkyl with 1-5 carbon atoms, R3 is an alkyl with 1-4 carbon atoms, an aryl with 6-10 carbon atoms, an alkenyl with 2-5 carbon atoms, an alkynyl with 2-5 carbon atoms or a fluoroalkyl with 1-5 carbon atoms. Meanwhile, the invention also discloses a lithium ion battery comprising the non-aqueous electrolyte. The non-aqueous electrolyte provided by the invention can effectively give consideration to both high and low temperature performances of the battery.

16 Claims, No Drawings

(56) References Cited

FOREIGN PATENT DOCUMENTS

| | | |
|---|---|---|
| CN | 103151559 A | 6/2013 |
| CN | 104300174 A | 1/2015 |
| CN | 104471780 A | 3/2015 |
| CN | 105161763 A | 12/2015 |
| CN | 105428715 A | 3/2016 |
| CN | 108110317 A | 6/2018 |
| CN | 108110319 A | 6/2018 |
| JP | 2011077029 A | 4/2011 |

\* cited by examiner

NON-AQUEOUS ELECTROLYTE AND LITHIUM ION BATTERY

TECHNICAL FIELD

The invention relates to the technical field of lithium ion batteries, and in particular to a non-aqueous electrolyte and a lithium ion battery.

BACKGROUND ART

At present, with the development of consumer digital and electronic products and new energy vehicles, the requirements of battery energy density are getting higher and higher, which makes it difficult for commercial lithium ion batteries to meet the requirements. It is an effective way to improve the energy density of lithium ion batteries by using high-voltage positive electrode materials and high energy density positive and negative electrode materials (such as high nickel materials for the positive electrode, and silicon-carbon materials for the negative electrode). Although non-aqueous electrolyte batteries made of these positive and negative materials have been put into practical use, their durability is not satisfactory, especially their service life is short at high temperature of 45° C. Especially for power vehicles and energy storage systems, non-aqueous electrolyte lithium-ion batteries are required to work properly in cold areas, and both high and low temperature performances should be taken into account.

A patent (No. CN00801010.2) of Matsushita Electric Industrial Co., Ltd. discloses an electrolyte containing $(R_{1a})P=(O)(OR_{2a})(OR_{3a})$ (wherein, Ria, Rea, Ria represent an aliphatic hydrocarbon group with 7-12 carbon atoms), which effectively controls the phenomenon that the discharge capacity decreases and the battery performances decrease during high-temperature storage as the charge-discharge cycle progresses. Chinese patents (No. CN201310046105.6) and (No. CN201410534841.0) respectively disclose an electrolyte comprising allyl phosphate and an electrolyte comprising propargyl phosphate, both of which can improve the high-temperature storage and high-temperature cycle performance of batteries.

Through a large number of experiments, the inventor found that although unsaturated phosphate ester can obviously improve the high-temperature storage and high-temperature cycle performance of the battery, the passivation film formed by unsaturated phosphate ester additive on the electrode interface has poor conductivity, which leads to high interfacial impedance, which obviously deteriorates the low-temperature performance and inhibits the application of non-aqueous lithium-ion battery at low temperature.

SUMMARY

The invention provides a non-aqueous electrolyte and a lithium ion battery, aiming at the problems that the addition of unsaturated phosphate in the existing non-aqueous electrolyte leads to the increase of the interfacial impedance of the passivation film and the deterioration of the low-temperature performance of the battery.

The technical solutions adopted by the present application to solve the technical problems are as follows:

In one respect, the present application provides a non-aqueous electrolyte, comprising a solvent, a lithium salt, an additive A and an additive B, wherein the additive A is selected from compound represented by structural formula 1, and the additive B is selected from one or more compounds represented by structural formula 2 and structural formula 3:

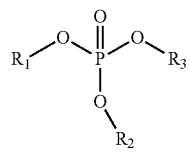

Structural formula 1

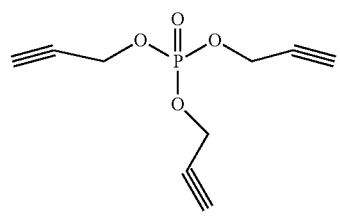

Structural formula 2

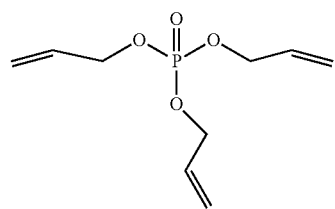

Structural formula 3

R1 is an alkenyl with 2-5 carbon atoms or an alkynyl with 2-5 carbon atoms, R2 is a fluoroalkyl with 1-5 carbon atoms, R3 is an alkyl with 1-4 carbon atoms, an aryl with 6-10 carbon atoms, an alkenyl with 2-5 carbon atoms, an alkynyl with 2-5 carbon atoms or a fluoroalkyl with 1-5 carbon atoms.

According to the non-aqueous electrolyte provided by the present application, additive A represented by structural formula 1, and additive B represented by structural formula 2 or structural formula 3 are added, wherein both additive A and additive B can decompose on the positive and negative electrodes, and the decomposition products of additive A and additive B are compounded to form a passivation film, the passivation film can inhibit the reaction between positive/negative active substances and the non-aqueous electrolyte, thereby preventing the decomposition, improving battery performances and reducing interfacial impedance. Moreover, the passivation film formed by the decomposition and compounds of additive A and additive B shows both high and low temperature performances which can not be achieved by adding any one of the additives alone.

Optionally, the mass percentage of the additive A is 0.1%-2%, and the mass percentage of the additive B is less than 0.5%, based on the mass percentage of the non-aqueous electrolyte being 100%.

Optionally, the additive A is selected from one or more of the following compounds 1 to 12:

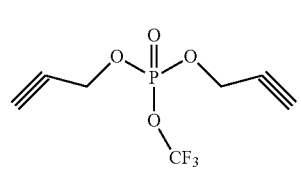

Compound 1

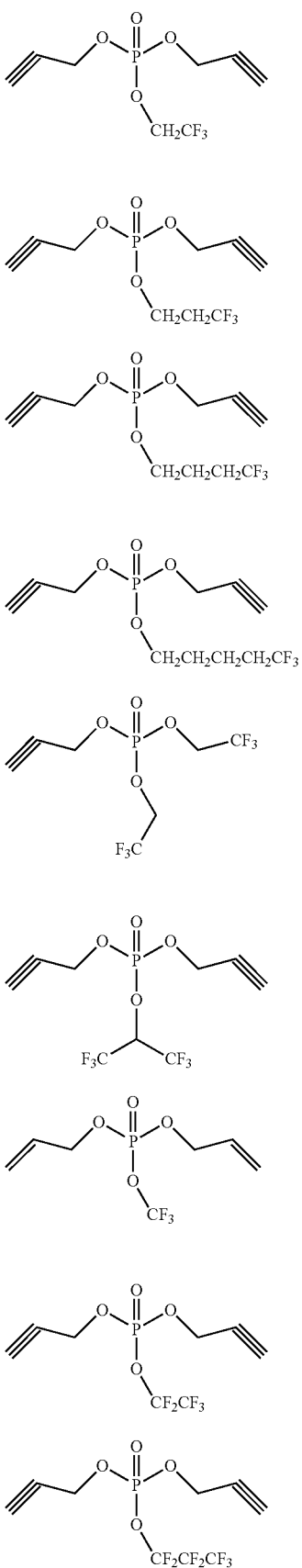

Compound 2
Compound 3
Compound 4
Compound 5
Compound 6
Compound 7
Compound 8
Compound 9
Compound 10

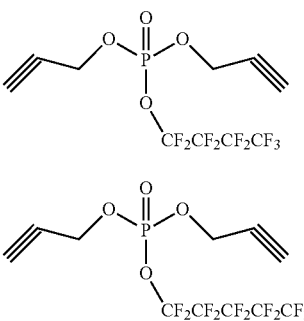

Compound 11

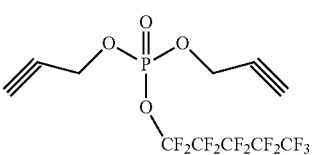

Compound 12

Optionally, the non-aqueous electrolyte further comprises one or more of vinylene carbonate, vinylethylene carbonate and fluoroethylene carbonate.

Optionally, the non-aqueous electrolyte further comprises one or more of 1,3-propane sultone and 1,4-butane sultone.

Optionally, the solvent comprises one or more of ethylene carbonate, propylene carbonate, butylene carbonate, dimethyl carbonate, diethyl carbonate, ethyl methyl carbonate and methyl propyl carbonate.

Optionally, the lithium salt comprises one or more of $LiPF_6$, $LiBF_4$, LiBOB, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$.

In another respect, the present application also provides a lithium ion battery, including an positive electrode, a negative electrode and the above-mentioned non-aqueous electrolyte.

Optionally, the positive electrode comprises a positive electrode active material, and the positive electrode active material is $LiNi_xCo_yMn_zL_{(1-x-y-z)}O_2$, wherein L is Al, Sr, Mg, Ti, Ca, Zr, Zn, Si, Cu, V or Fe, $0 \le x \le 1$, $0 \le y \le 1$, $0 \le z \le 1$, $0 \le x+y+z \le 1$.

Optionally, the positive electrode active material is $LiCo_xL_{(1-x)}O_2$, and L is Al, Sr, Mg, Ti, Ca, Zr, Zn, Si, Cu, V or Fe, $0 < x \le 1$.

DETAILED DESCRIPTION OF THE INVENTION

In order to make the technical problems to be solved, technical solutions and beneficial effects of the present application clearer, the present application will be further described in detail with reference to the following embodiments. It should be understood that the specific embodiments described herein are only used to explain the present application, not intended to limit the present application.

An embodiment of the invention discloses a non-aqueous electrolyte, comprising a solvent, a lithium salt, an additive A and an additive B, wherein the additive A is selected from compound represented by structural formula 1, and the additive B is selected from one or more compounds represented by structural formula 2 and structural formula 3:

Structural formula 1

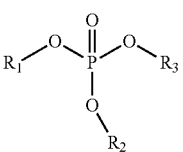

Structural formula 2

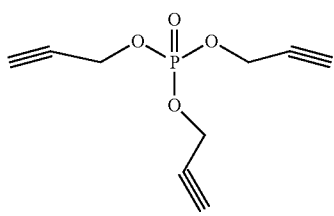

Structural formula 3

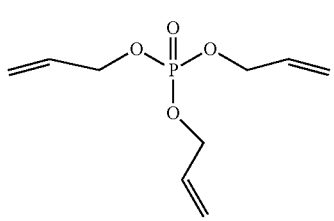

R1 is an alkenyl with 2-5 carbon atoms or an alkynyl with 2-5 carbon atoms, R2 is a fluoroalkyl with 1-5 carbon atoms, R3 is an alkyl with 1-4 carbon atoms, an aryl with 6-10 carbon atoms, an alkenyl with 2-5 carbon atoms, an alkynyl with 2-5 carbon atoms or a fluoroalkyl with 1-5 carbon atoms.

According to the non-aqueous electrolyte provided by the present application, additive A represented by structural formula 1, and additive B represented by structural formula 2 or structural formula 3 are added, wherein both additive A and additive B can decompose on the positive and negative electrodes, and the decomposition products of additive A and additive B are compounded to form a passivation film, the passivation film can inhibit the reaction between positive/negative active substances and the non-aqueous electrolyte, thereby preventing the decomposition, improving battery performances and reducing interfacial impedance. Moreover, the passivation film formed by the decomposition and compounds of additive A and additive B shows both high and low temperature performances which can not be achieved by adding any one of the additives alone.

In another embodiment, the addition amount of the additive A and the additive B in the electrolyte can be adjusted to improve the electrolyte, and the high and low temperature performances and overall performance of the battery comprising the electrolyte.

Generally, in the electrolyte of the present application, additive A and additive B can be added with amount of regular additives, but it should be noted that in a certain preferred range, additive A and additive B can show obvious synergistic effect, which is more conducive to the improvement of battery performances.

Specifically, in the preferred embodiments, the mass percentage of the additive A is 0.1%-2%, and the mass percentage of the additive B is less than 0.5%, based on the mass percentage of the non-aqueous electrolyte being 100%.

Specifically, the mass percentage of the additive A may be 0.1%, 0.2%, 0.4%, 0.6%, 0.8%, 1%, 1.2%, 1.4%, 1.6%, 1.8% or 2%; the mass percentage of the additive B may be 0.05%, 0.1%, 0.15%, 0.2%, 0.3%, 0.4% or 0.5%.

When the addition amount of the additive A or the additive B is outside the above range, it is unfavorable to improve the low temperature performance of the battery.

In some embodiments, the additive A is selected from one or more of the following compounds 1 to 12:

Compound 1

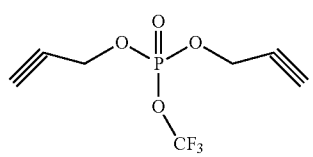

Compound 2

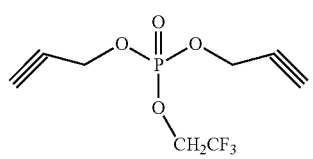

Compound 3

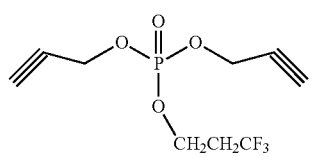

Compound 4

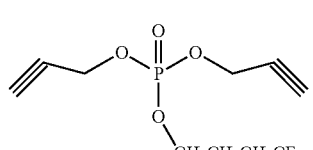

Compound 5

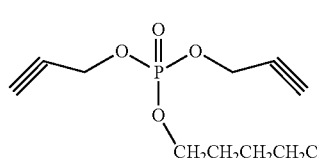

Compound 6

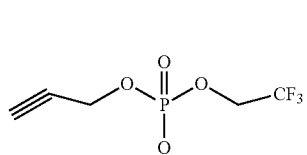

Compound 7

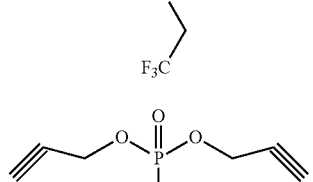

Compound 8

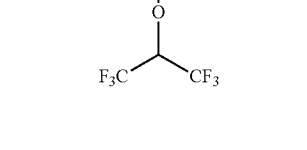

Compound 9

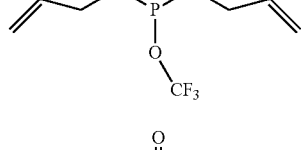

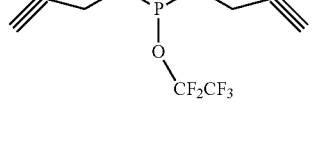

-continued

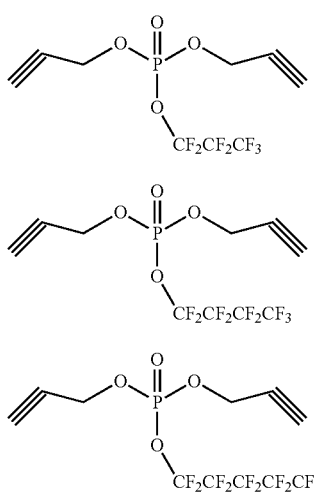

Compound 10

Compound 11

Compound 12

In some embodiments, the non-aqueous electrolyte further comprises one or more of vinylene carbonate, vinylethylene carbonate and fluoroethylene carbonate.

In some embodiments, the non-aqueous electrolyte further comprises one or more of 1,3-propane sultone and 1,4-butane sultone.

The vinylene carbonate, vinylethylene carbonate, fluoroethylene carbonate, 1,3-propane sultone and 1,4-butane sultone are additives of non-aqueous electrolyte, which can form a more stable passivation film on the surface of the graphite negative electrode, thus significantly improving the cycle performance of the lithium ion battery. Preferably, the mass content of the additive in the non-aqueous electrolyte is 0.1%-5%, preferably 0.2%-5%, and more preferably 0.5%-3%.

In some embodiments, the solvent includes one or more of ethylene carbonate, propylene carbonate, butylene carbonate, dimethyl carbonate, diethyl carbonate, ethyl methyl carbonate and methyl propyl carbonate.

More preferably, the solvent is a composition of ethylene carbonate, diethyl carbonate and ethyl methyl carbonate.

In some embodiments, the lithium salt includes one or more of $LiPF_6$, $LiBF_4$, LiBOB, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$.

The content of the lithium salt can be varied within a wide range, and preferably, the content of the lithium salt in the non-aqueous electrolyte of the lithium ion battery is 0.1%-15%.

Another embodiment of the present application provides a lithium ion battery, including an positive electrode, a negative electrode and the above-mentioned non-aqueous electrolyte.

The positive electrode includes a positive electrode active material, and the positive electrode active material is $LiNi_xCo_yMn_zL_{(1-x-y-z)}O_2$, wherein L is Al, Sr, Mg, Ti, Ca, Zr, Zn, Si, Cu, V or Fe, $0 \le x \le 1$, $0 \le y \le 1$, $0 \le z \le 1$, $0 \le x+y+z \le 1$.

More preferably, the positive electrode active material is $LiCo_xL_{(1-x)}O_2$, and L is Al, Sr, Mg, Ti, Ca, Zr, Zn, Si, Cu, V or Fe, $0 < x \le 1$.

The positive electrode further comprises a positive electrode current collector for extracting current, and the positive electrode active material covers the positive electrode current collector.

The negative electrode includes a negative electrode active material which can be made of carbon materials, metal alloys, lithium-containing oxides and silicon-containing materials.

The negative electrode further comprises a negative electrode current collector for extracting current, and the negative electrode active material covers the negative electrode current collector.

In some embodiments, a separator is further interposed between the positive electrode and negative electrode, which is a regular separator in the field of lithium ion batteries, so it will not be described here again.

As the lithium ion battery provided by the embodiments of the invention contains the non-aqueous electrolyte described above, the high-temperature and low-temperature performances of the lithium ion battery are effectively improved.

The present invention will be further illustrated by the following examples.

Embodiment 1

The embodiments are used for explaining the non-aqueous electrolyte, the lithium ion battery and the preparation method thereof disclosed by the invention, and the preparation method includes the following steps:

1) Preparation of Non-Aqueous Electrolyte:

Ethylene carbonate (EC), diethyl carbonate (DEC) and ethyl methyl carbonate (EMC) were mixed according to the mass ratio of EC:DEC:EMC=1:1:1, then lithium hexafluorophosphate ($LiPF_6$) was added until the molar concentration was 1 mol/L. The components with the mass percentage shown in Embodiment 1 in Table 1 were added based on the total mass of the non-aqueous electrolyte being 100%.

2) Preparation of Positive Plate:

Positive electrode active material lithium nickel cobalt manganese oxide ($LiNi_{0.5}Co_{0.2}MnO_3O_2$), conductive carbon black and binder polyvinylidene fluoride were mixed according to the mass ratio of 96.8:2.0:1.2, and then dispersed in N-methyl-2-pyrrolidone to obtain a positive electrode slurry. The slurry was evenly coated on both sides of aluminum foil, then dried, calendered and vacuum dried, and the aluminum leads were welded by ultrasonic welder to obtain a positive plate. The thickness of the positive plate was 120-150 μm.

3) Preparation of Negative Plate:

Negative electrode active material artificial graphite, conductive carbon black Super-P, binder styrene butadiene rubber (SBR) and carboxymethyl cellulose (CMC) were mixed according to the mass ratio of 94:1:2.5:2.5, and then dispersed in deionized water to obtain negative electrode slurry. The slurry was coated on both sides of copper foil, then dried, calendered and vacuum dried, and the nickel leads were welded by ultrasonic welder to obtain a negative plate. The thickness of the negative plate was 120-150 μm.

4) Preparation of Battery Core:

A three-layer separator with a thickness of 20 μm was placed between the positive plate and the negative plate. The positive plate, negative plate and separator formed a sandwich structure, which was wound, flattened, and placed in an aluminum foil, and then vacuum baked at 75° C. for 48 hours to obtain the battery core to be filled with liquid.

5) Injection and Formation of Battery Core:

In a glove box with the dew point controlled below −40° C., the electrolyte prepared above was injected into the battery core, and the battery core was vacuum packaged and let stand for 24 h.

Then, according to the following steps, the formation of the first charging was carried out:

0.05 C current charging for 180 min, 0.1 C constant current charging to 3.95V, vacuum sealing for the second time, standing at 45° C. for 48 h. And then then further constant current charging to 4.4V with 0.2 C current, and constant current discharging to 3.0V with 0.2 C current.

Embodiments 2~16

Embodiments 2~16 are used to illustrate the non-aqueous electrolyte for a lithium ion battery, the lithium ion battery and the preparation methods disclosed in the present application. Embodiments 2~16 include most of the steps in Embodiment 1, with the differences that:
in the step of preparation of non-aqueous electrolyte:
the components with the mass percentage shown in Embodiment 2~16 in Table 1 were added based on the total mass of the non-aqueous electrolyte being 100%.

Comparative Examples 1~7

Comparative Examples 1~7 are used to illustrate the non-aqueous electrolyte for a lithium ion battery, the lithium ion battery and the preparation methods disclosed in the present application. Comparative Examples 1~7 include most of the steps in Embodiment 1, with the differences that:
in the step of preparation of non-aqueous electrolyte:
the components with the mass percentage shown in Comparative Examples 1~7 in Table 1 were added based on the total mass of the non-aqueous electrolyte being 100%.

Performance Tests

The following performance tests were performed on the lithium ion batteries prepared in the above Embodiments 1-16 and Comparative Examples 1-7:

1) Test for High-Temperature Cycle Performance

The battery was put in an oven with a constant temperature of 45° C., charged to 4.4V with a constant current of 1 C, then charged with a constant voltage until the current dropped to 0.02 C, and then discharged to 3.0V with a constant current of 1 C, and then cycled, the discharge capacity of the first cycle and the discharge capacity of the last cycle were recorded, and the capacity retention rate of high-temperature cycle was calculated according to the following formula:

Capacity retention rate=Discharge capacity of the last cycle/Discharge capacity of the first cycle*100%

2) Test for High-Temperature Storage Performance

The formed battery was charged to 4.4V with constant current and constant voltage of 1 C at normal temperature, and the first discharge capacity and initial thickness of the battery were measured. After being stored at 60° C. for 7 days, the battery was discharged to 3V at 1 C, and the retention capacity, recovery capacity and thickness of the battery after storage were measured. The calculation formulas are as follows:

Capacity retention rate (%)=Retention capacity/Initial capacity*100%;

Capacity recovery rate (%)=Recovery capacity/initial capacity*100%;

Thickness expansion rate (%)=(Thickness after storage−Initial thickness)/Initial thickness*100%.

3) Test for Low-Temperature Performance

At 25° C., the formed battery was charged to 4.4V with 1 C constant current and constant voltage, then discharged to 3.0V with 1 C constant current, and the discharge capacity was recorded. Then the battery was charged to 4.4V with constant current and constant voltage at 1 C, let stand at −20° C. for 12 h, then discharged to 3.0V with constant current at 0.3 C, and the discharge capacity was recorded.

Low-temperature discharge efficiency at −20° C.=0.3 C discharge capacity (−20° C.)/1 C discharge capacity (25° C.)*100%.

The test results are shown in Table 1.

TABLE 1

| | Additive A | Additive B | Cycle for 300 times at 45° C. 1C | After 7 days of storage at 60° C. | | | Discharge efficiency at −20° C. 0.3C |
| --- | --- | --- | --- | --- | --- | --- | --- |
| | | | | Capacity retention rate | Capacity recovery rate | Thickness expansion rate | |
| Embodiment 1 | Compound 1: 0.5% | Tripropargyl phosphate: 0.05% | 89.3% | 89.3% | 92.3% | 10.7% | 85.8% |
| Embodiment 2 | Compound 2: 0.5% | Tripropargyl phosphate: 0.05% | 89.1% | 89.5% | 92.6% | 10.3% | 85.2% |
| Embodiment 3 | Compound 3: 0.5% | Tripropargyl phosphate: 0.05% | 88.9% | 89.4% | 92.9% | 9.9% | 84.9% |
| Embodiment 4 | Compound 4: 0.5% | Tripropargyl phosphate: 0.05% | 88.3% | 88.4% | 90.7% | 10.8% | 85.3% |
| Embodiment 5 | Compound 2: 1% | Tripropargyl phosphate: 0.05% | 91.5% | 91% | 94.6% | 9.5% | 83.2% |
| Embodiment 6 | Compound 2: 1.5% | Tripropargyl phosphate: 0.05% | 95% | 92.5% | 95.2% | 8.9% | 81.8% |
| Embodiment 7 | Compound 2: 1% | Tripropargyl phosphate: 0.1% | 92.1% | 91.5% | 95.3% | 9.8% | 81% |
| Embodiment 8 | Compound 2: 1% | Tripropargyl phosphate: 0.2% | 93.8% | 91.9% | 95.5% | 9.7% | 80.5% |
| Embodiment 9 | Compound 1: 0.5% | Triallyl phosphate: 0.05% | 89% | 89.1% | 92% | 10.1% | 85.7% |
| Embodiment 10 | Compound 2: 0.5% | Triallyl phosphate: 0.05% | 89.2% | 89.3% | 92.3% | 10% | 85% |
| Embodiment 11 | Compound 3: 0.5% | Triallyl phosphate: 0.05% | 88.8% | 89.2% | 92.6% | 9.3% | 84.7% |
| Embodiment 12 | Compound 4: 0.5% | Triallyl phosphate: 0.05% | 88.1% | 88.1% | 90.5% | 10.5% | 85.8% |

TABLE 1-continued

| | Additive A | Additive B | Cycle for 300 times at 45° C. 1C | After 7 days of storage at 60° C. | | | Discharge efficiency at -20° C. 0.3C |
| --- | --- | --- | --- | --- | --- | --- | --- |
| | | | | Capacity retention rate | Capacity recovery rate | Thickness expansion rate | |
| Embodiment 13 | Compound 2: 1% | Triallyl phosphate: 0.1% | 92% | 91.2% | 95.5% | 9.4% | 82% |
| Embodiment 14 | Compound 2: 1% | Triallyl phosphate: 0.2% | 93.6% | 91.6% | 95.4% | 9.6% | 81.8% |
| Embodiment 15 | Compound 2: 1% | Tripropargyl phosphate: 1% | 85.5% | 86.2% | 88.1% | 11.2% | 70.2% |
| Embodiment 16 | Compound 2: 1% | Triallyl phosphate: 1% | 85.1% | 86.4% | 88.2% | 11.1% | 70.3% |
| Comparative Example 1 | — | Tripropargyl phosphate: 0.1% | 81% | 82% | 85.4% | 14% | 81.2% |
| Comparative Example 2 | — | Tripropargyl phosphate: 0.2% | 83% | 84.5% | 87.4% | 13.1% | 80.3% |
| Comparative Example 3 | — | Triallyl phosphate: 0.1% | 80.5% | 81.6% | 86% | 13.7% | 82.1% |
| Comparative Example 4 | — | Triallyl phosphate: 0.2% | 83.4% | 85.1% | 88.2% | 12.6% | 81.3% |
| Comparative Example 5 | Compound 2: 0.5% | — | 82.4% | 84% | 86.7% | 13% | 80% |
| Comparative Example 6 | Compound 2: 1% | — | 84% | 86.2% | 88% | 11.2% | 76.5% |
| Comparative Example 7 | Compound 2: 1.5% | — | 86.7% | 88.5% | 90.1% | 10.4% | 73.2% |

According to the results in Table 1, comparing Embodiments 1~14 with Comparative Examples 1~7, it can be seen that the non-aqueous electrolyte of Embodiments 1~14 in which both additive A and additive B were added enabled the battery to have better high-temperature performance and low-temperature performance, as compared with the non-aqueous electrolyte in which additive A or additive B was added alone. While Comparative Examples 1~7 also showed good low-temperature performance, but the high-temperature performance was obviously poor.

Comparing Embodiments 1~14 with Embodiments 15 and 16, it can be seen that adding additive A and additive B in a certain range can make the battery show better high-temperature performance and low-temperature performance. If the addition amount exceeds a certain range, the low-temperature performance of the battery will be adversely affected.

The above descriptions are only preferred embodiments and are not intended to limit the present invention. Any modifications, equivalent substitutions and improvements made within the spirit and principles of the present invention shall be included within the scope of protection of the present invention. Further, unless otherwise required by context, singular terms shall include pluralities and plural terms shall include the singular.

The invention claimed is:

1. A non-aqueous electrolyte, comprising a solvent, a lithium salt, an additive A and an additive B, wherein the additive A is selected from compound represented by structural formula 1, and the additive B is selected from one or more compounds represented by structural formula 2 and structural formula 3:

Structural formula 1

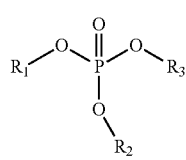

Structural formula 2

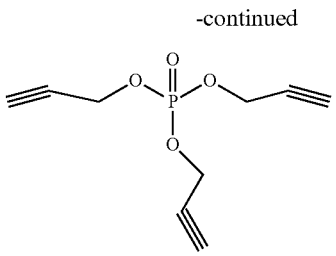

Structural formula 3

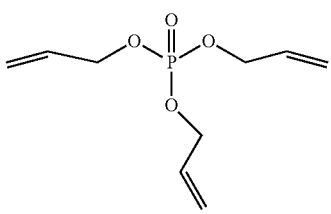

R1 is an alkenyl with 2-5 carbon atoms or an alkynyl with 2-5 carbon atoms, R2 is a fluoroalkyl with 1-5 carbon atoms, R3 is an alkyl with 1-4 carbon atoms, an aryl with 6-10 carbon atoms, an alkenyl with 2-5 carbon atoms, an alkynyl with 2-5 carbon atoms or a fluoroalkyl with 1-5 carbon atoms.

2. The non-aqueous electrolyte of claim 1, wherein the mass percentage of the additive A is 0.1%-2%, and the mass percentage of the additive B is less than 0.5%, based on the mass percentage of the non-aqueous electrolyte being 100%.

3. The non-aqueous electrolyte of claim 1, wherein the additive A is selected from one or more of the following compounds 1 to 12:

4. The non-aqueous electrolyte of claim 1, wherein the non-aqueous electrolyte further comprises one or more of vinylene carbonate, vinylethylene carbonate and fluoroethylene carbonate.

5. The non-aqueous electrolyte of claim 1, wherein the non-aqueous electrolyte further comprises one or more of 1,3-propane sultone and 1,4-butane sultone.

6. The non-aqueous electrolyte of claim 1, wherein the solvent comprises one or more of ethylene carbonate, propylene carbonate, butylene carbonate, dimethyl carbonate, diethyl carbonate, ethyl methyl carbonate and methyl propyl carbonate.

7. The non-aqueous electrolyte of claim 1, wherein the lithium salt comprises one or more of $LiPF_6$, $LiBF_4$, LiBOB, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$.

8. A lithium ion battery, comprising a positive electrode, a negative electrode and a non-aqueous electrolyte the non-aqueous electrolyte comprises a solvent, a lithium salt, an additive A and an additive B, wherein the additive A is selected from compound represented by structural formula 1, and the additive B is selected from one or more compounds represented by structural formula 2 and structural formula 3:

Structural formula 3

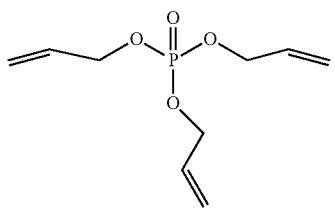

R1 is an alkenyl with 2-5 carbon atoms or an alkynyl with 2-5 carbon atoms, R2 is a fluoroalkyl with 1-5 carbon atoms, R3 is an alkyl with 1-4 carbon atoms, an aryl with 6-10 carbon atoms, an alkenyl with 2-5 carbon atoms, an alkynyl with 2-5 carbon atoms or a fluoroalkyl with 1-5 carbon atoms.

9. The lithium ion battery of claim 8, wherein the positive electrode comprises a positive electrode active material, and the positive electrode active material is $LiNi_xCo_yMn_zL_{(1-x-y-z)}O_2$, wherein L is Al, Sr, Mg, Ti, Ca, Zr, Zn, Si, Cu, V or Fe, $0 \leq x \leq 1$, $0 \leq y \leq 1$, $0 \leq z \leq 1$, $0 \leq x+y+z \leq 1$.

10. The lithium ion battery of claim 9, wherein the positive electrode active material is $LiCo_xL_{(1-x)}O_2$, and L is Al, Sr, Mg, Ti, Ca, Zr, Zn, Si, Cu, V or Fe, $0 < x \leq 1$.

11. The lithium ion battery of claim 8, wherein the mass percentage of the additive A is 0.1%-2%, and the mass percentage of the additive B is less than 0.5%, based on the mass percentage of the non-aqueous electrolyte being 100%.

12. The lithium ion battery of claim 8, wherein the additive A is selected from one or more of the following compounds 1 to 12:

Compound 1

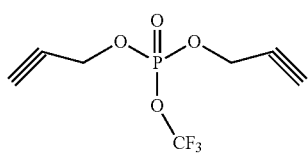

Compound 2

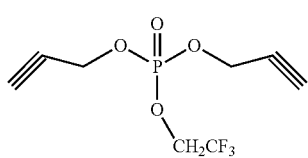

Compound 3

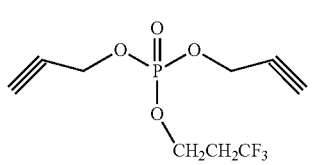

Compound 4

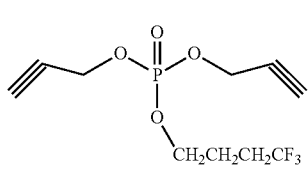

Compound 5

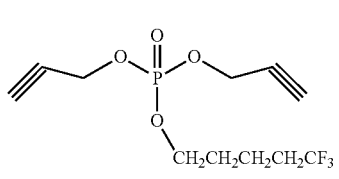

Compound 6

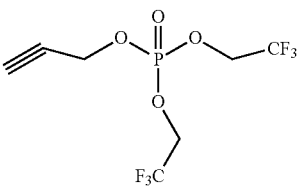

Compound 7

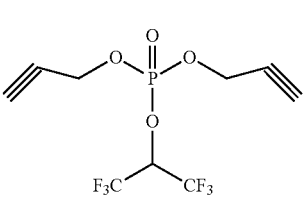

Compound 8

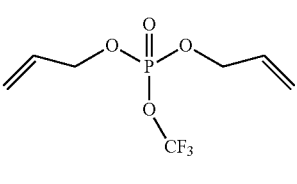

Compound 9

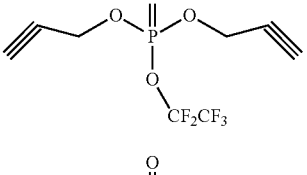

Compound 10

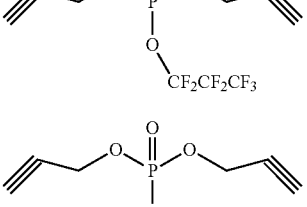

Compound 11

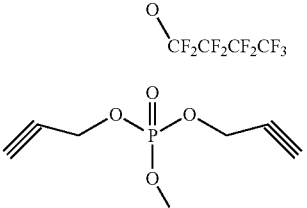

Compound 12

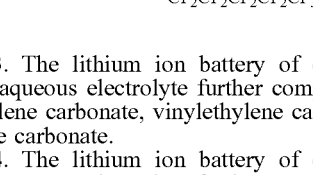

13. The lithium ion battery of claim 8, wherein the non-aqueous electrolyte further comprises one or more of vinylene carbonate, vinylethylene carbonate and fluoroethylene carbonate.

14. The lithium ion battery of claim 8, wherein the non-aqueous electrolyte further comprises one or more of 1,3-propane sultone and 1,4-butane sultone.

15. The lithium ion battery of claim 8, wherein the solvent comprises one or more of ethylene carbonate, propylene carbonate, butylene carbonate, dimethyl carbonate, diethyl carbonate, ethyl methyl carbonate and methyl propyl carbonate.

16. The lithium ion battery of claim 8, wherein the lithium salt comprises one or more of $LiPF_6$, $LiBF_4$, LiBOB, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$.

* * * * *